US007960649B2

(12) United States Patent
Giefers

(10) Patent No.: US 7,960,649 B2
(45) Date of Patent: Jun. 14, 2011

(54) ATTACHMENT DEVICE FOR AN ELECTRICAL CONNECTION TERMINAL FOR ATTACHMENT TO A HOUSING WALL

(75) Inventor: Stefan Giefers, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 527 days.

(21) Appl. No.: 12/158,863

(22) PCT Filed: Dec. 13, 2006

(86) PCT No.: PCT/EP2006/011984

§ 371 (c)(1),
(2), (4) Date: Jun. 23, 2008

(87) PCT Pub. No.: WO2007/079889

PCT Pub. Date: Jul. 19, 2007

(65) Prior Publication Data

US 2008/0302557 A1 Dec. 11, 2008

(30) Foreign Application Priority Data

Dec. 22, 2005 (DE) ........................ 10 2005 062 059

(51) Int. Cl.
*H02G 3/08* (2006.01)

(52) U.S. Cl. ......... 174/50; 174/53; 174/153 R; 174/135; 439/535; 248/906

(58) Field of Classification Search .................... 174/50, 174/53, 58, 153 R, 135; 220/4.02; 439/535; 248/906
See application file for complete search history.

(56) References Cited

U.S. PATENT DOCUMENTS

| | | | | |
|---|---|---|---|---|
| 7,109,413 | B2 * | 9/2006 | Chen | 174/50 |
| 7,238,881 | B1 * | 7/2007 | Barr et al. | 174/50 |
| 2004/0067682 | A1 | 4/2004 | Korsunsky et al. | |
| 2004/0078961 | A1 | 4/2004 | Chen et al. | |

FOREIGN PATENT DOCUMENTS

| | | |
|---|---|---|
| DE | 08215606 | 9/1982 |
| DE | 3231690 | 3/1984 |
| DE | 69307775 | 7/1997 |
| DE | 10315661 | 11/2004 |
| EP | 0572012 | 12/1993 |
| FR | 2315781 | 1/1977 |
| GB | 941628 | 11/1963 |

OTHER PUBLICATIONS

International Search Report for International No. PCT/EP2006/011984 mailed on May 23, 2007.

* cited by examiner

*Primary Examiner* — Dhiru R Patel
(74) *Attorney, Agent, or Firm* — Leydig, Voit & Mayer, Ltd.

(57) ABSTRACT

An attachment device for electrical connection terminals to pass through a housing wall includes a terminal housing including an insulating material. The terminal housing is attachable in an opening in the housing wall. The attachment device includes an attachment insert detachably affixable in the terminal housing. The attachment insert is configured to attach the terminal housing in the opening of the housing wall.

14 Claims, 3 Drawing Sheets

ATTACHMENT DEVICE FOR AN ELECTRICAL CONNECTION TERMINAL FOR ATTACHMENT TO A HOUSING WALL

CROSS REFERENCE TO PRIOR APPLICATIONS

This application is a U.S. National Phase application under 35 U.S.C. §371 of International Application No. PCT/EP2006/011984, filed on Dec. 13, 2006 and claims benefit to German Patent Application No. DE 10 2005 062 059.0, filed on Dec. 22, 2005. The International Application was published in German on Jul. 19, 2007 as WO 2007/079889 under PCT Article 21 (2).

FIELD

The present invention relates to an attachment device for attaching an electrical connection terminal to a housing wall, having a terminal housing made of insulating material that can be attached in an opening in the housing wall.

BACKGROUND

Electrical connection terminals of the present type have been developed for devices having closed housings and are known as so-called feed-through terminals. German patent specification DE 32 31 690 C2 describes a terminal housing made up of two parts, in which the outer part can be moved to the housing wall from the outside, while the inner part can be moved to the housing wall from the inside, said parts being attached to each other by means of connecting elements associated with each other, especially latching elements that can be latched to each other, a process in which they accommodate the housing wall between them. The type of feed-through terminals under discussion here have to be guided towards each other from both sides of the housing wall and they latch in such a manner that a simple removal of the feed-through terminal is not possible. If the terminal is nevertheless detached again, the latching tabs wear out, which could detrimentally affect the tight fit. As a result, the entire terminal has to be replaced. Moreover, the housing walls can exhibit manufacturing tolerances that cannot be compensated for by the wedge shape of the terminal means, so that a tight fit is not always possible.

German patent application DE 103 15 661 A1 describes a wall feed-through terminal in which a locking mechanism is provided that uses a pivotable actuation wedge and that is joined to the locking mechanism in one piece. The locking element for attaching the terminal housing is inserted together with the terminal housing into an opening in the metallic wall of the device or housing, where it is clamped with a pivotable actuation wedge. Even though this described teaching allows a simple attachment and detachment of the wall feed-through terminal, the provided flexible connection web is susceptible to torsion and can already be damaged if the actuation tool is guided slightly incorrectly. Moreover, the provided ribs wear out in response to frequent opening and closing of the actuation device.

SUMMARY

An aspect of the present invention is to provide an attachment device for a connection terminal that is simple to attach and detach, that is also cost-effective and that accounts for a secure and tight fit, even if the housing wall displays manufacturing tolerances.

In an embodiment, the present invention provides an attachment device for electrical connection terminals to pass a line through a housing wall. The attachment device includes a terminal housing including an insulating material and attachable in an opening in the housing wall. An attachment insert is detachably affixable in the terminal housing. The attachment insert is configured to attach the terminal housing in the opening in the housing wall.

BRIEF DESCRIPTION OF THE DRAWINGS

The attachment device according to the present invention is described below on the basis of preferred embodiments and depicted with reference to schematic drawings. The following are shown.

DETAILED DESCRIPTION

Figure 1:
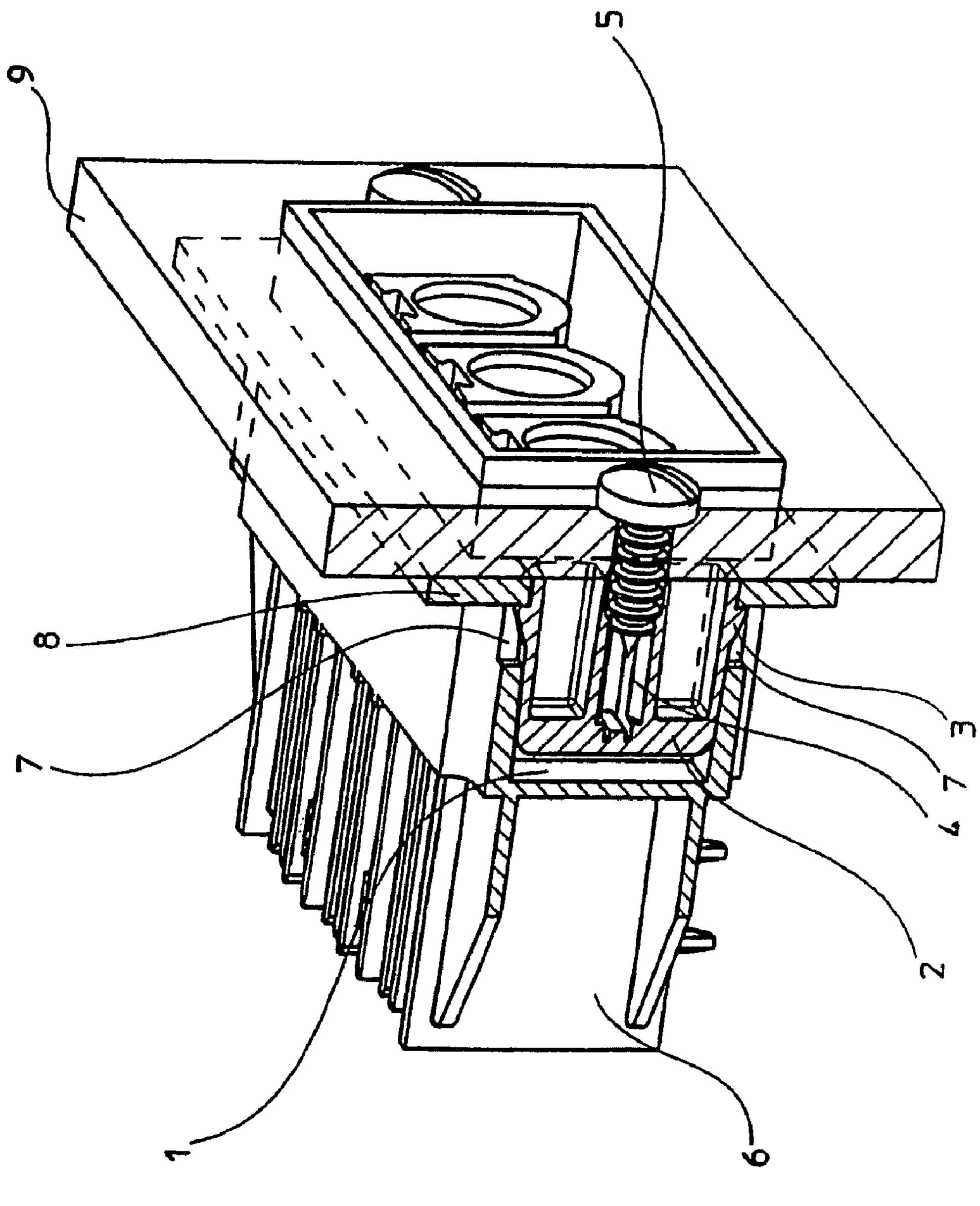
FIG. 1—a perspective view of an attachment device for electrical connection terminals to pass a line through a housing wall.

Therefore, it is provided according to the present invention that the attachment device has an attachment insert that can be affixed in the terminal housing on the attachment insert periphery and that can be once again detached, said attachment insert serving to attach the terminal housing in the opening in the housing wall.

The present invention entails an advantage that the attachment insert can be simply placed into the terminal housing and removed once again, and that a practically one-piece terminal housing is formed for the attachment of the terminal housing of the type described above and, for purposes of the final attachment, said one-piece terminal housing can be simply moved to the housing wall by hand. In this context, it is particularly advantageous that the attachment insert can be a detachable part that, instead of the entire terminal housing, can be replaced easily and cost-effectively and that can be manufactured inexpensively.

A preferred embodiment of the attachment device according to the present invention provides that the attachment insert can be attached—by means of at least one latching mechanism arranged on its periphery—in a receiving space of the attachment device with at least one latching opening that is arranged so as to match the latching mechanisms.

This embodiment entails an advantage that, when the attachment insert is placed into the receiving space of the terminal housing, the attachment insert is attached preliminarily in the receiving space, thus preventing the attachment insert from accidentally falling out of the receiving space, for example, when the terminal housing with the attachment device is moved to the housing wall.

In another embodiment of the teaching according to the present invention, it is provided that the terminal housing consists of disk-shaped terminals that can be lined up together and the receiving space for the attachment insert is provided in at least one attachment disk that can be intermated with the terminals that can be lined up together and attached to the housing wall. This achieves an advantage that connection terminals consisting of individual terminals that can be lined up together can be easily attached according to the invention to the housing wall by means of attachment disks that can be additionally flanged onto and/or intermated with this type of connection terminal and that have a receiving space provided to accommodate an attachment insert.

According to the inventive teaching, it is also the case that two legs and a web that connects the legs are provided for the attachment insert, whereby the web generates a spring force perpendicular to the direction in which an attachment means is inserted, towards the periphery of the attachment insert.

This entails an advantage that the attachment insert can be affixed preliminarily in the terminal housing, thus preventing the attachment insert from accidentally falling out of the terminal housing.

Another preferred embodiment of the attachment device according to the present invention provides for at least one of the two legs of the attachment insert to have a hollow space.

Thinning out the material in at least one of the legs has an advantage that the attachment means with which the entire attachment device can be attached in the housing wall can be inserted more easily and the attachment means can displace material in the direction of the periphery of the attachment insert.

Another preferred embodiment of the attachment device according to the present invention provides for a guide element to be formed between the legs of the attachment insert in order to receive an attachment means.

One advantage of this preferred embodiment is that it becomes possible to insert an attachment means that allows a final attachment of the above-mentioned type of connection terminal in the housing wall, that compensates for manufacturing tolerances in the thickness of the housing wall and that ensures a tight fit for the attachment device having the above-mentioned type of connection terminal in the housing wall, even in the case of severe ambient loads such as, for example, vibrations.

Preferably, the present invention provides that the latching mechanisms and the latching openings are arranged in the terminal housing at a distance from the housing wall that is greater than the thickness of the placement edge.

An advantage of this particular arrangement is that the latching mechanisms and the latching openings are arranged at a distance from the housing wall that is greater than the placement edge provided as a stop, tensile forces in the direction of the housing wall can be generated which, in the case of the above-mentioned type of connection terminal, allow an extraordinarily secure and tight fit in the housing wall, thus preventing the attachment device from accidentally being detached from the terminal housing in case of vibrations and compensating for manufacturing tolerances of the housing wall.

An preferred refinement of the present invention is provided in that the outer dimensions of the attachment insert are equal to or smaller than the inner dimensions of the receiving space but in that the latching mechanisms can still engage with the latching openings after being put in place.

An advantage of this preferred refinement is that pressing the attachment insert together makes it possible to easily insert it into the receiving space and, once the legs are released, the latching mechanisms engage with the latching openings, thus preventing it from accidentally falling out and allowing a sturdy attachment of the terminal in the housing wall.

It is also preferably provided that the outer dimensions of the attachment insert can be reduced by being pressed together to such an extent that it can be placed into the receiving space and the at least one latching mechanism can engage with the at least one corresponding latching opening once it has been released.

As a preferred refinement of the present invention, it is also provided that the attachment device can achieve its final attachment in the housing wall with any desired attachment means that functions like a wedge. The insertion of an attachment means ensures that the attachment insert is preliminarily affixed in the receiving space of the terminal housing and that the entire terminal housing attains its final tight fit in the housing wall owing to the support and/or reinforcement provided by the wedge effect of the attachment insert, thus preventing the attachment insert from accidentally being detached or falling out of the attachment device while also compensating for manufacturing tolerances of the housing wall.

It goes without saying that the above-mentioned features as well as the features that will still be explained below can be used not only in the combination indicated in each case but also in other combinations or on their own, without departing from the scope of the present invention.

FIG. 1 shows a preferred embodiment of an attachment device of the inventive type for an electrical connection terminal through a housing wall. The housing wall 9 has an opening to receive the terminal housing 6. The terminal housing 6 has a receiving space 1 and a placement edge 8. The receiving space 1 serves to accommodate the attachment insert 2 and has latching openings 7 with which the latching mechanisms 3 of the attachment insert 2 engage. The placement edge 8 serves as a stop in the insertion direction for purposes of preventing the terminal housing 6 from being inserted all the way through. The latching mechanisms 3 serve to preliminarily affix the attachment insert 2 in the receiving space 1. Once the attachment means 5 is inserted and tightened, the latching mechanisms 3 press the terminal housing 6 beyond the placement edge 8 against the housing wall 9. The attachment insert 2 is inserted with a positive fit into the receiving space 1 of the terminal housing 6. In order to achieve the final attachment of the terminal housing in the housing wall, an attachment means 5, for instance, a screw with a self-tapping thread, is inserted into the guide element 4 of the attachment insert 2.

Figure 2:
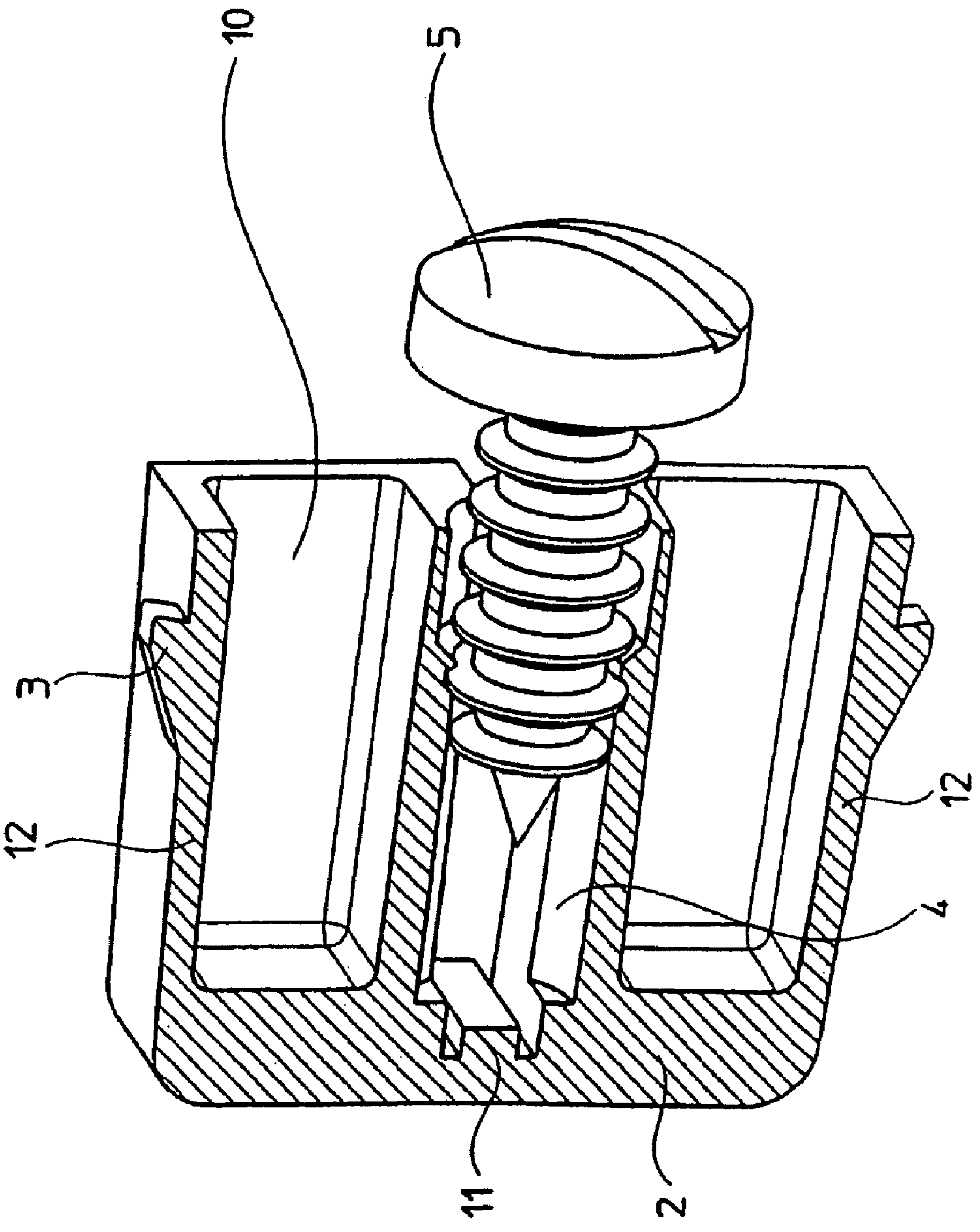
FIG. 2—a perspective view of a longitudinal section of an attachment insert.

When both legs 12 of the attachment insert 2 are pressed together as shown in FIG. 2, the outer dimensions of the attachment insert 2 are reduced to such an extent that the attachment insert 2 can be easily inserted into the receiving space 1 as shown in FIG. 1. For this purpose, the path that can be traveled by pressing together the two legs 12 of the attachment insert 2 is equal to or greater than the sum of the heights of the latching mechanisms 3. Once the attachment insert 2 has been inserted and the legs 12 have been released, the legs 12 spring back to their original position as a result of the spring force generated by the web 11, as a result of which the latching mechanisms 3 engage with the latching openings 7 of the receiving space 1, thus bringing about a latching in the manner of a preliminary fixation and thus the creation of a practically one-piece terminal housing which can then be moved by hand in its entirety to the housing wall. The practically one-piece terminal housing formed in this process can be subsequently attached from the other side of the housing wall 9 with an attachment means 5, for example, a self-tapping screw, without the risk of the attachment insert 2 falling out accidentally. The insertion of the attachment means 5 into the guide element 4 and the subsequent attachment, for instance, by tightening a self-tapping screw, give rise to a positive and non-positive connection of the terminal housing 6 to the housing wall 2.

FIG. 2 shows the structure of the attachment insert 2. The attachment insert 2 comprises two legs 12 and a web 11 that connects both legs 12. These two legs 12 each have a hollow space 10. This hollow space 10 serves to transfer the forces created by the insertion of an attachment means 5 perpendicular to the direction of insertion, towards the periphery of the attachment insert 2, thus ensuring a secure and tight fit of the attachment insert 2 in the receiving space 1 and providing a reliable guidance for the attachment means 5 into the guide element 4. Moreover, the hollow space 10 causes a thinning of the material in order to allow the attachment means 5 to displace material in the direction of the periphery of the attachment insert 2, thus facilitating the insertion of the attachment means 5. For purposes of inserting the attachment insert 2 into the receiving space 1 of the terminal housing 6, the two legs 12 are pressed together over the web 11, as a result of which the outer dimensions of the attachment insert 2 are reduced. This generates a spring force that is oriented opposite to the force exerted when the legs are pressed together. In this state, the attachment insert 2 can be easily inserted into the receiving space 1. The path that can be traveled by the legs 12 has to be equal to or greater than the sum of the heights of the latching mechanisms 3 in order to achieve sufficient preliminary fixation. The attachment insert 2 is held in place in the receiving space 1 by the spring force being exerted and by the latching of the at least one latching mechanism 3 into the at least one latching opening 7. The insertion of the attachment means 5, on the one hand, reinforces the wedge effect of the attachment insert 2 and, on the other hand, attaches the attachment insert 2 in the housing wall 9 with a positive fit by means of the tensile forces in the direction of the housing wall 9 generated when the attachment means 5 is inserted. In this process, fluctuations in the material of the housing wall 9 are compensated for and a sufficiently tight fit of the entire device in the housing wall 9 is made possible. This tight fit is sufficient, even if vibration forces or other mechanical influences occur after the final attachment.

Figure 3:
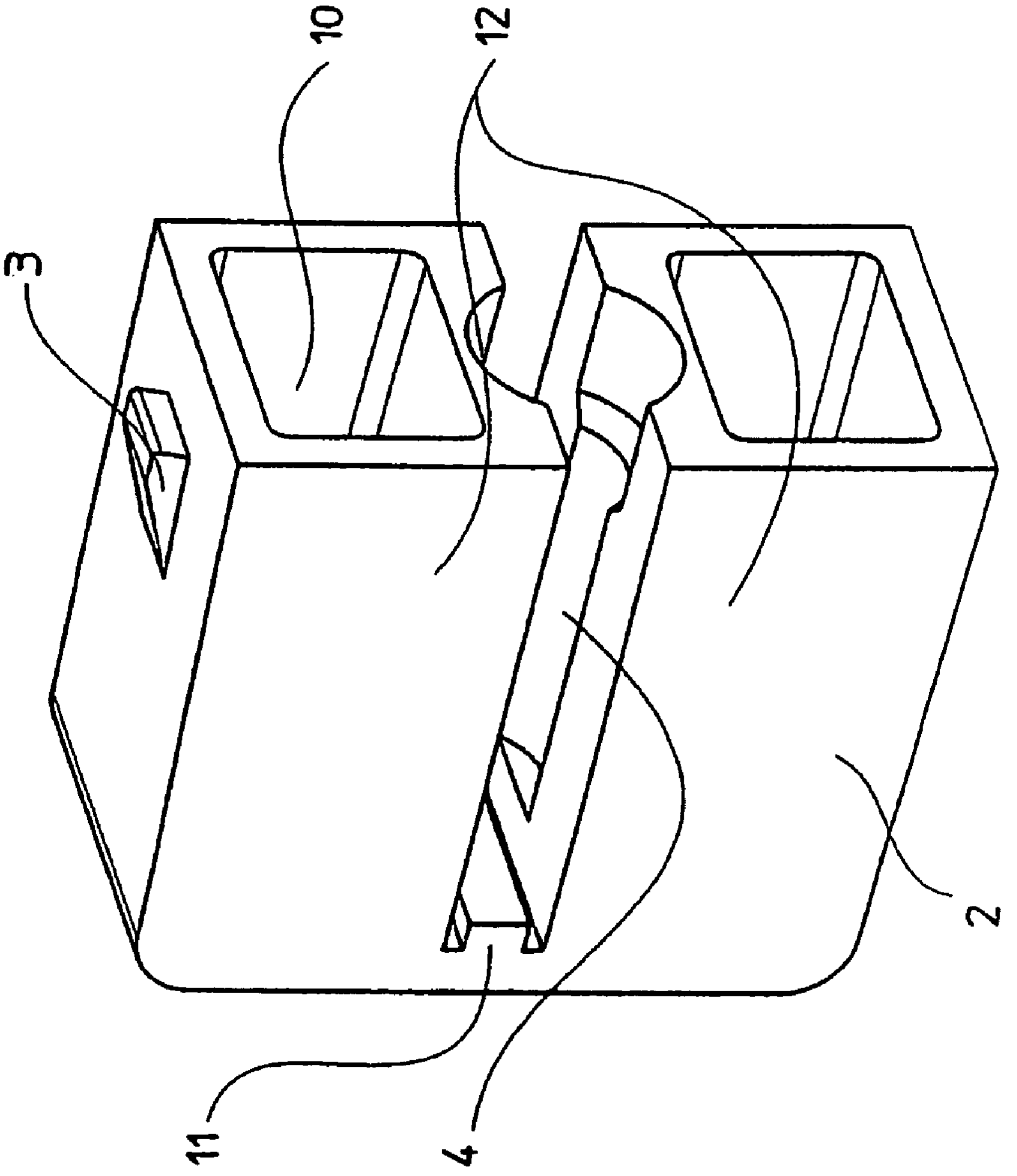
FIG. 3—a perspective view of an attachment insert without an inserted attachment means.

FIG. 3 shows a perspective view of the attachment insert 2. The guide element 4 formed between the legs 12 has a circle-segment curvature and is intended to accommodate the attachment means 5. The two legs 12 each have a hollow space 10. The latching mechanisms 3 that can engage with the latching openings 7 of the terminal housing 6 can be seen on the periphery of the attachment insert 2. When the two legs 12 are pressed together into the guide element 4, the web 11 generates a spring force in the opposite direction, so that, once the force exerted onto the legs 12 when they are pressed together is removed, the attachment insert 2 returns to its original shape, thus being held with a positive fit in the receiving space 1. Moreover, sufficient space has to be provided in the guide element 4 for conventional attachment means 5 such as, for example, commercially available, self-tapping screws. The web 11 that connects the two legs 12 of the attachment devices 2 serves to generate a spring force vertically to the direction of insertion of the attachment means 5 towards the periphery of attachment insert 2.

Nowadays, disk-shaped terminals are often intermated to form a terminal housing. Therefore, the attachment insert 2 can continue to be used unchanged, even if a terminal disk that can be flanged on or added is provided with a receiving space 1 and a placement edge 8 and it is added to or flanged onto the intermated terminal housing.

The invention claimed is:

1. An attachment device for electrical connection terminals to pass a line through a housing wall, the attachment device comprising:

a terminal housing including an insulating material and a receiving space; and an attachment insert configured to removably attach the terminal housing in an opening in the housing wall, the attachment insert including at least one latching mechanism disposed on a periphery of the attachment insert and configured to match at least one latching opening in the receiving space of the terminal housing.

2. The attachment device as recited in claim 1, wherein the terminal housing includes a plurality of disk-shaped terminals able to be lined up together and wherein the attachment insert includes at least one attachment disk intermatable with the terminals, the at least one attachment disk receivable in the receiving space.

3. The attachment device as recited in claim 2, wherein at least one of the terminal housing and the attachment disk includes a placement edge configured to support the attachment device on the housing wall.

4. The attachment device as recited in claim 1, wherein the attachment insert includes a first and a second leg and a web connecting the legs to each other.

5. The attachment device as recited in claim 4, wherein at least one of the legs includes a hollow space.

6. The attachment device as recited in claim 4, further comprising a guide element disposed between the two legs and configured to receive an attachment element.

7. The attachment device as recited in claim 6, wherein the guide element includes a circle-segment shape.

8. The attachment device as recited in claim 6, further comprising a placement edge disposed on the terminal housing and configured to support the attachment device on the housing wall, and wherein an insertion of the attachment element in the attachment insert produces a tensile force in a direction from the attachment insert toward the placement edge so as to allow a positive attachment of the attachment insert in the receiving space and the terminal housing in the housing wall.

9. The attachment device as recited in claim 6, wherein the attachment element includes a self-tapping screw.

10. The attachment device as recited in claim 6, wherein the attachment element includes an intensifying device configured to intensify a wedge effect of the attachment insert.

11. The attachment device as recited in claim 4, wherein the attachment device is configured to receive an attachment element insertable in an insertion direction and wherein the web is configured to generate a spring force in a direction perpendicular to the insertion direction and toward a periphery of the attachment insert.

12. The attachment device as recited in claim 1, further comprising a placement edge disposed on the terminal housing and configured to support the attachment device on the housing wall, and wherein the at least one latching mechanism and the at least one latching opening are disposed in the terminal wall at a distance from the housing wall greater than a thickness of the placement edge.

13. The attachment device as recited in claim 1, wherein the attachment insert has outer dimensions equal to or smaller than the inner dimensions of the receiving space of the terminal housing.

14. The attachment device as recited in claim 1, wherein the attachment insert has outer dimensions reducible by pressing, so as to enable the attachment insert to be received in the receiving space, and wherein the at least one latching mechanism is engageable with the corresponding at least one latching opening when the pressing is stopped.

* * * * *